United States Patent [19]
Kooken

[11] Patent Number: 5,991,169
[45] Date of Patent: Nov. 23, 1999

[54] ARC WELDING POWER SUPPLY

[75] Inventor: Todd Eric Kooken, Lyndhurst, Ohio

[73] Assignee: Lincoln Global, Inc., Cleveland, Ohio

[21] Appl. No.: 09/039,494

[22] Filed: Mar. 16, 1998

[51] Int. Cl.[6] .............................. H02M 3/335; B23K 9/00
[52] U.S. Cl. ...................................... 363/17; 219/137 PS
[58] Field of Search .................................. 363/17, 98, 89, 363/16, 97, 131, 132; 219/108, 110, 130.01, 130.33, 137 PS

[56] References Cited

U.S. PATENT DOCUMENTS

| | | |
|---|---|---|
| 3,938,024 | 2/1976 | Clarke . |
| 4,677,366 | 6/1987 | Wilkinson et al. . |
| 4,897,522 | 1/1990 | Bilczo et al. . |
| 4,947,021 | 8/1990 | Stava ................................ 219/137 PS |
| 5,146,398 | 9/1992 | Vila-Masot et al. . |
| 5,237,153 | 8/1993 | Gilliland ............................. 219/130.1 |
| 5,272,313 | 12/1993 | Karino et al. ........................... 363/142 |
| 5,351,175 | 9/1994 | Blankenship . |
| 5,446,641 | 8/1995 | Reynolds et al. ......................... 363/17 |
| 5,489,757 | 2/1996 | Schuermann et al. .................. 219/110 |
| 5,824,990 | 10/1998 | Geissler et al. ........................ 363/142 |
| 5,864,116 | 1/1999 | Baker ................................. 219/130.33 |

*Primary Examiner*—Matthew Nguyen
*Attorney, Agent, or Firm*—Vickers, Daniels & Young

[57] ABSTRACT

A dual stage power supply for creating a D.C. welding current through an arc welding gap, the power supply comprising an input inverter stage with a full wave rectified A.C. voltage source and an output capacitor; and, an output chopper stage connected across the output capacitor, with the chopper including output leads connected across the arc welding gap, a switch for gating the output current of the inverter stage at a controlled rate through the leads and through the arc welding gap, an output inductor in one of the leads between the switch and the arc welding gap and a free wheeling diode across the leads between the switch and the output inductor.

39 Claims, 6 Drawing Sheets

ARC WELDING POWER SUPPLY

The present invention relates to the art of industrial power supplies and more particularly to a power supply for an arc welding operation, wherein a D.C. welding current is passed through a choke to a welding station or welding gap between an electrode and a workpiece.

INCORPORATION BY REFERENCE

The present invention relates to an arc welding power supply employing inverter technology where sequencing of alternate conductive paths by switches converts an essentially D.C. voltage link into a D.C. output voltage through use of an intermediate transformer. Representative arc welding inverters are illustrated in Bilczo U.S. Pat. No. 4,897,522 and Blankenship U.S. Pat. No. 5,351,175, which patents are incorporated by reference herein as background information regarding inverters used in an arc welding application. The invention utilizes the concept of driving the inverter by a single phase or three phase off-line voltage so that A.C. voltage is converted to a D.C. output voltage. When an inverter is used for such application, it is somewhat common practice to provide a power factor correcting controller, known as a PFC controller. Representative use of power factor correction in inverter type switching power supplies is illustrated in Wilkinson U.S. Pat. No. 4,677,366 and Vila-Masot U.S. Pat. No. 5,146,398, which patents are representative in nature and are incorporated by reference herein to show use of a power factor correcting controller in a power supply connected to an A.C. voltage source. Many arrangements are available for power factor correction and these patents are incorporated by reference herein as background information and to show general technology for correcting the power factor by changing the switching sequence in a converter or inverter.

In the preferred embodiment of the invention, a current source, full bridge inverter topography is employed; however, the inverter of the invention is based generally upon an inverter as described in Clarke U.S. Pat. No. 3,938,024 wherein a D.C. driven current source, push-pull inverter is shown. The inverter is illustrated as a D.C. to D.C. inverter; however, in accordance with the invention the inverter is used as a A.C. to D.C. inverter resembling a somewhat conventional boost converter. Clarke U.S. Pat. No. 3,938,024 is incorporated by reference herein to illustrate one of several types of inverter topography which can be used in accordance with the present invention. Consequently, details of the somewhat standard operation of an inverter need not be repeated.

BACKGROUND OF INVENTION

Inverters or converters are used routinely as a power supply for an arc welding operation to create a D.C. welding current passing through an arc welding gap. Since the output for arc welding is generally a D.C. current and the input is often an A.C. voltage, there is difficulty in maintaining a high power factor. The inverter can not operate from a continuous, wide input voltage range. The main advantage of working from a wide input voltage range is that the power source will be able to operate on universal input voltages. Conventional power sources operate from multiple input voltages by using a reconnection scheme. This reconnection scheme can either be accomplished manually or automatically. The problem with using a reconnection scheme is that the machines are designed to work optimally for a certain input voltage. Welding performance will diminish when the input voltage varies from the optimal. Also it is not realistic to build a machine with a reconnection scheme that will satisfy all of the voltage requirements around the world. The ability to operate from a continuous input voltage range is an advantage for engine driven power supplies used for welding. Further, the discontinuous nature of the input and output currents creates the need for substantial filtering, with the resulting cost and power loss. In addition, an inverter has certain constraints which will not allow accurate control of the D.C. current at the welding gap due to the need for controlled operation of the transformer, upon which the inverter is based. The constraints of an inverter power supply for use in arc welding demand added components and require a compromise between the electrical needs for the welding operation and the off-line input A.C. voltage.

THE INVENTION

The present invention is directed to a power supply that can be used for arc welding, which power supply will allow customizing of the D.C. output current, without the necessity of corresponding compromises at the single phase or three phase A.C. voltage input. The present invention overcomes the limitations associated with an inverter that is specially adapted for use as an arc welding power supply. In accordance with the present invention, the arc welding power supply is a dual stage, or two stage, electrical system for receiving variable A.C. voltage at the input and providing a well controlled, optimized D.C. welding output current.

In accordance with the present invention, there is provided a dual stage power supply for creating a D.C. welding current through an arc welding gap, wherein the power supply comprises an input inverter stage and an output chopper stage. In accordance with standard topography, the input inverter stage has a transformer with a first polarity secondary winding, a second polarity secondary winding and a primary winding means for creating current pulses in the secondary windings by selectively energizing the primary winding means. The dual stage power supply is driven by a full wave rectified A.C. voltage source which may cause a variable input current. The inverter has a first switch with a transfer state for passing current through the primary winding means to create a first polarity current pulse in the first secondary winding and a second switch with a transfer state for passing current through the primary winding means to create a second polarity current pulse in the second secondary winding. In practice, the first and second switch may each include one or more simultaneously gated or triggered switches. In the preferred embodiment, a current source, full bridge inverter is used where no current flows through the primary when the first and second switches are both in the conductive state, i.e. on. In a current source, full bridge inverter, opening one of the two switches causes current flow in the primary winding means. The direction of flow is determined by the particular switch in the non-conductive state. Power is transferred to the secondary windings when current flows through the primary winding. In accordance with standard inverter technology, the secondary windings are connected to a rectifier so that the current pulses in the secondary windings produce a D.C. voltage across an output capacitor of the inverter.

The second stage of the novel power supply is an output chopper connected across the capacitor of the inverter stage and including output leads connected across the welding gap between the electrode and workpiece of a welding station. The chopper includes a third switch for gating the output current of the inverter stage at a controlled high rate through the leads and across the welding gap. By using a pulse width modulator, in accordance with standard practice, the D.C. welding current can be maintained in a desired pulse shape or at a desired voltage level to control the welding process at the arc welding station. In accordance with standard topography, the chopper includes an output inductor in one of the leads between the third switch and the welding gap to maintain current flow between current pulses through the third switch. A freewheeling diode is connected across the leads between the third switch and the output inductor.

By using the present invention, a pulse width modulator can control the gating of the third switch into conduction to accurately contour the D.C. welding current passing through the welding gap defined by the workpiece and electrode. In accordance with the invention, control of the D.C. output current is isolated from the A.C. input voltage. Thus, the pulse width modulator of the chopper optimizes the welding operation and the inverter stage optimizes the input characteristics of the system. In accordance with this invention, the inverter stage, which is isolated from the chopper stage, can be controlled by standard commercial controllers, such as Unitrode's Isolated Boost PFC Preregulator Controller UCC3857. This controller chip can be used to correct the power factor at the input of the inverter stage separately from the welding demands at the output of the chopper stage. The present invention utilizes a current source inverter driven by an A.C. voltage through an input inductor at the input side of the inverter. The current source can be regulated by the PFC controller identified above, or other similar controllers, which regulate the power factor of the inverter at the inverter input to create a D.C. output voltage across a capacitor. This output capacitor forms the input, or D.C. link, of the second stage chopper of the present invention.

The present invention involves the novel combination of an inverter stage and a chopper stage joined in series in a power supply to convert an A.C. voltage to a regulated D.C. welding current. The novel power supply can be accurately controlled at the welding operation without adversely affecting optimization of the A.C. voltage input. The basic function of the inverter stage is to convert the A.C. voltage to a D.C. bus voltage across an output capacitor. The bus voltage is regulated to a level less than 113 volts to comply with the peak voltage requirement in IEC 60974-1. The inverter stage is a current source inverter generally based on the inverter described and illustrated in Clarke U.S. Pat. No. 3,938,024. Although this patent describes a D.C. to D.C. inverter, the same inverter can function as an A.C. to D.C. inverter. As an A.C. to D.C. inverter, the operation of the inverter resembles that of a conventional boost converter. By using this type of inverter, a standard PFC controller can be used to accurately control the power factor of the A.C. source at the input of the inverter. The present invention uses a current-source inverter, whereas conventional inverters are normally voltage source inverters. They are supplied with a regulated voltage at the input terminals of the inverter. In the present invention, current through the input inductor is the input current through the inverter. An advantage of using a current source inverter is that the input current is easily programmable and can inherently accept a wide range of input voltages as experienced in engine driven arc welding power supplies and other A.C. voltage sources. Such current source inverters, to which the present invention is directed, have an output voltage that is lower than the input voltage, thus resulting in the advantage that the inverter can operate from high input voltages to produce low output voltages, such as a D.C. voltage less than 113 volts across the output capacitor of the inverter stage. Such inverters provide isolation so the output of the inverter can be regulated to a fixed voltage, while the input can be driven at a high power factor. Consequently, the invention involves the use of a current source inverter that can have a variety of topographies, such as a current source, full bridge inverter (illustrated as the preferred embodiment), a current source, push-pull converter (as shown in Clarke U.S. Pat. No. 3,938,024) or a current source, double forward converter, to name only the most common inverter topographies. The invention involves the combination of the current source inverter with an output second stage chopper which steps down the D.C. voltage to a D.C. welding current by use of a pulse width modulator. The chopper is an excellent converter for high current, low voltage welding applications. Since the chopper will supply a continuous output current through an inductor, the pulse width modulator provides excellent regulation of the welding operation.

By employing the present invention, the power supply can operate from a continuous, widely varying input voltage with no mechanical reconnections required and without experiencing degradation of the performance associated with the power supply. The invention allows the shaping of the input current by controlling the overlapping conduction states of the switching devices, referred to as the "first" switch and the "second" switch. In a current source, full bridge inverter, current will rise when both switches are on and no current passes through the primary winding. The current will decrease when only one switch is on. The result is a continuous havorsine current waveform. Thus a high power factor can be maintained. In a current source, push-pull inverter, when both switches are conductive, the primary winding has current flow in both directions that cancel each other. The present invention creates less EMI interference and, thus, requires substantially less filtering.

There are several different current source inverters which can be used as the first stage of the present invention. In the preferred embodiment, a current source, full bridge inverter is used; however, other current source inverters, such as a current source, push-pull inverter shown in Clarke U.S. Pat. No. 3,938,024, or a double forward inverter could be employed in the preferred embodiment of the invention. In these inverters power is transferred when one switch is non-conductive and current is flowing through one section of the primary windings; however, when both switches are conductive there is current flow in both the primary windings, which does not transfer power. Other inverter stages would function adequately as a current source, first stage of the novel power supply. In a current source, full bridge inverter, the switches have a minimum duty cycle of 50%. Since the switches are usually on, they are alternatively turned off and back on for symmetric transformer flux operation. The symmetric transformer flux operation prevents core saturation. In the present invention, power factor at the input of the inverter can be controlled by changing the duty cycle of the first and second switches in the inverter. The duty cycles are controlled by standard controllers to cause the input current to follow a sinusoidal current wave form which is in phase with the input A.C. voltage. This power factor correction is accomplished by sensing the phase of the voltage and the phase of the inverter current. The pulse width modulator in the inverter stage of the power supply controls the switches to force the phase of the input current toward the phase of the input A.C. voltage. The amplitude of the input current is controlled to maintain a constant D.C. output voltage for the inverter stage, which output or bus voltage is the D.C. input voltage of the second stage chopper. In accordance with an aspect of the invention, the input inductor of the current source is magnetically coupled with a separate or auxiliary winding connected to the output capacitor of the inverter, through a diode, so the coupled winding assists in start-up and shut-down. If there is an overvoltage, overcurrent, or normal shutdown condition, all of the switches are turned off. When this happens, the auxiliary winding allows the input inductor to discharge. The coupled winding assists in overvoltage or overcurrent conditions. It also provides a current path to the output capacitor during start-up of the inverter. The details of the auxiliary coupled winding will be explained in the preferred embodiment. The auxiliary winding is not necessary under normal running conditions. It is used for start-up and shut-down operations.

By using the present invention, the arc welding power supply can have a single phase A.C. input voltage with a wide range of input levels. The use of a single phase A.C. input source allows easy use of the standard power factor correcting controller for the inverter stage of the power supply. A three phase A.C. input voltage can be employed in the invention. In this instance, for best results, a three stage power factor correcting controller must be employed so that each phase of the input A.C. voltage is sensed and compared with the A.C. current of each phase. Thus, to obtain the best power factor correction when using a three phase A.C. voltage input, a separate inverter is used in each phase.

The primary object of the present invention is the provision of a two stage power supply for arc welding, which power supply employs a switching device in each stage so that the power supply can be used to control a D.C. arc welding process without adverse effect on the input A.C. voltage.

Another object of the present invention is the provision of a two stage power supply, as defined above, which power supply includes a combination of an inverter switching device as the input stage and a chopper switching device as the output stage. Both of these switching devices can be controlled by a pulse width modulator in accordance with standard practice; however, other control schemes are possible.

Yet another object of the present invention is the provision of a two stage, or dual stage, power supply as defined above, which power supply can maintain a regulated intermediate D.C. voltage for supplying a D.C. current to the welding operation. This provides a wide range of input voltage compliance.

Yet another object of the present invention is the provision of a two stage, or dual stage power supply for arc welding, as defined above, which power supply can use a standard power factor correcting regulator for the input inverter so the power factor of the A.C. input source can be maintained relatively high.

Still a further object of the present invention is the provision of a two stage, or dual stage, arc welding power supply, as defined above, which power supply has a current source input inverter stage and allows control of the inverter current to control power factor.

These and other objects and advantages will become apparent from the following description taken together with the accompanying drawing in which:

PREFERRED EMBODIMENT

Figures 1, 2:
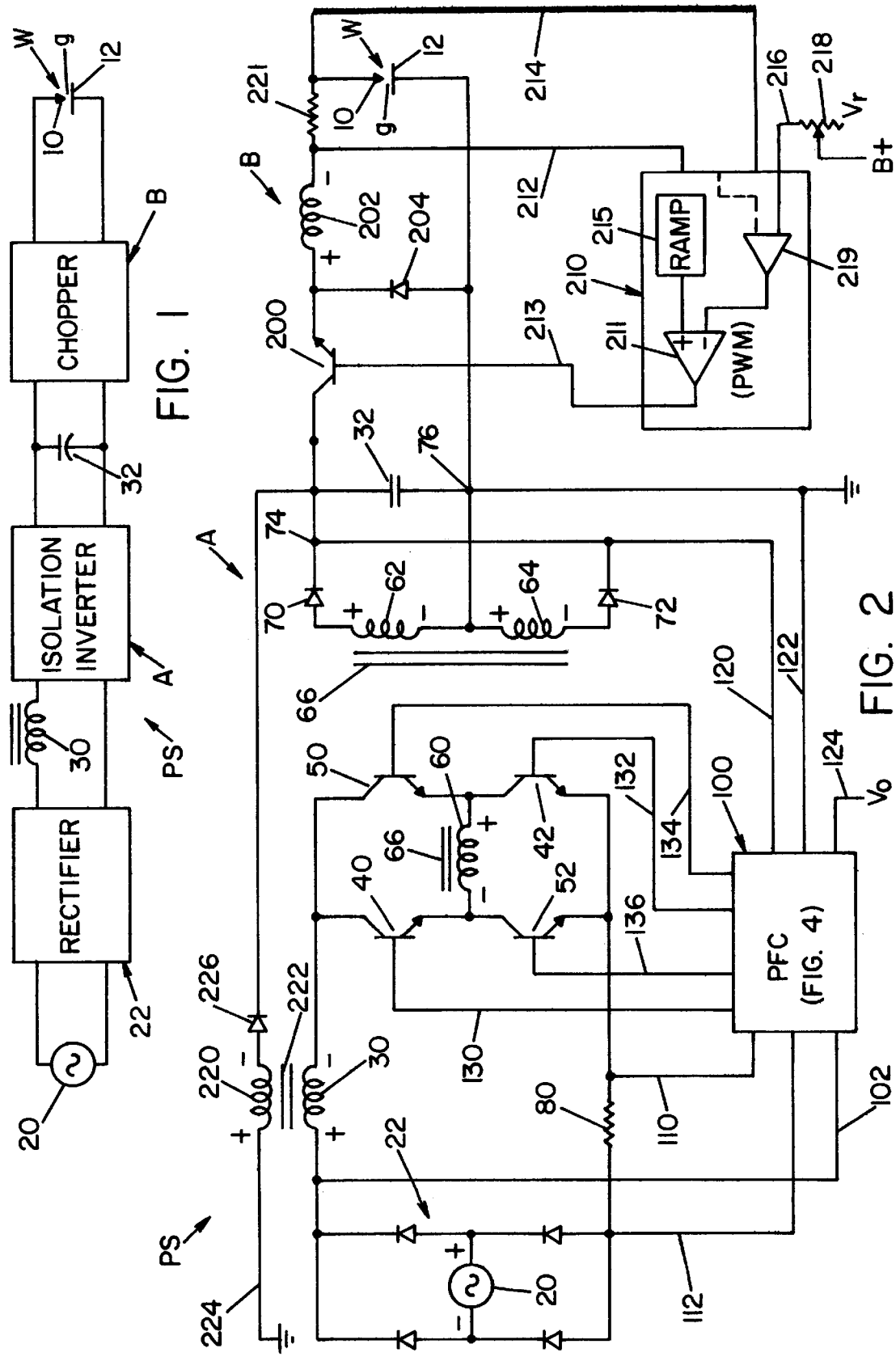
FIG. 1 is a schematic block diagram illustrating the basic architecture of the two stage, or dual stage, arc welding power supply of the present invention.
FIG. 2 is a wiring diagram showing a first preferred embodiment of the present invention using a full bridge inverter with a single phase input.

Referring now to the drawings, wherein the showings are for the purpose of illustrating preferred embodiments of the present invention and not for the purpose of limiting same, FIG. 1 shows the general architecture of the invention. Power supply PS is used to control the welding operation at welding station W in the form of electrode 10, workpiece 12 and arc gap g. In accordance with the invention, the power supply includes two stages, i.e. an inverter A and a chopper B. An A.C. input voltage source 20 is rectified by a full wave rectifier 22 to create a continuous havorsine current directed through input inductor 30 and, thus, through the isolation inverter A having a controlled regulated voltage output across capacitor 32. The bus voltage on this capacitor forms the input of chopper B. In operation, the alternating voltage of input source 20 is directed to inverter A, which is a switching device for creating regulated voltage that is used by a standard down chopper so the D.C. welding current at station W is controlled by a pulse width modulator. This two stage, or dual stage, power supply uses a voltage source input and a D.C. arc welding current output. Inverter A isolates the A.C. input voltage source from the welding station so both the welding operation and the input source can be optimized.

Figure 4:
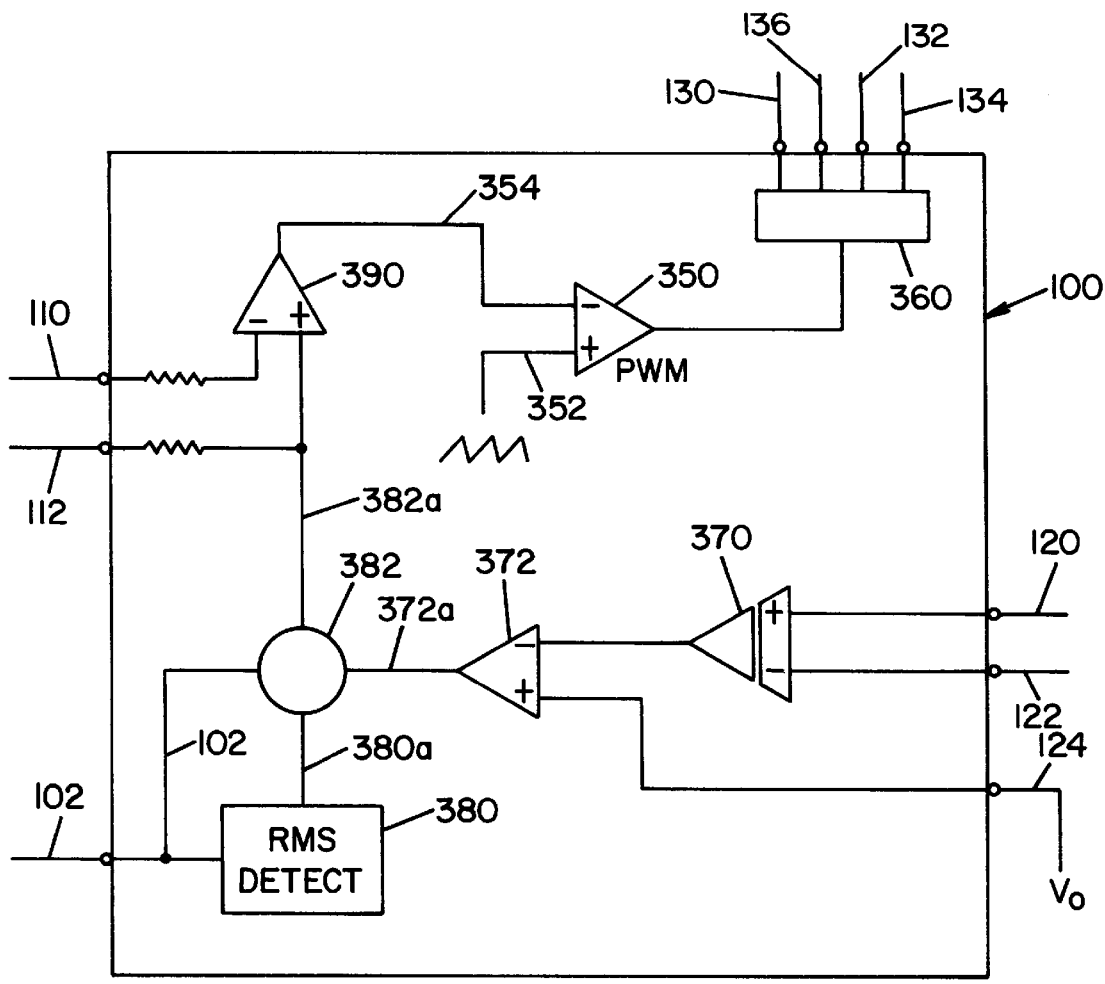
FIG. 4 is a block diagram illustrating a somewhat standard power factor correcting controller used to control the power factor of the input stage inverter of the embodiments of the invention illustrated in FIGS. 2 and 3.

Referring now to FIG. 2, power supply PS of the preferred embodiment of the invention is shown in more detail and employs elements described in the discussion of FIG. 1 together with other components forming the two stage, or dual stage, power supply. Inverter A has "first" switches 40, 42 and "second" switches 50, 52 selectively rendered conductive and non-conductive to drive a transformer having a primary winding, or primary winding means 60, with a first secondary output winding 62 and a second secondary output winding 64. The secondary windings are oppositely poled and coupled with primary winding 60 through a common core 66. Rectifying diodes 70, 72 apply current pulses from windings 62, 64 to output capacitor 32 by way of positive terminal 74 and negative terminal 76, which negative terminal is mid-point between secondary windings 62, 64. Pulses in windings 62, 64 charge capacitor 32 to a desired voltage. In practice, this voltage is below 113 volts D.C. Turning now to the primary side of inverter A, inverter current is sensed as a voltage across shunt 80. This sensed current is the sum of the current through the "first" switch when the "second" switch is off, through the "second" switch when the "first" switch is off, and through both the "first" and "second" switches when both switches are on. Thus, the sensed current has the same waveform shape and a proportional magnitude as the actual current, which in practice is the current through the input inductor. This actual inverter current is controlled so that the power factor of input source 20 is forced toward unity. This power factor correction is done by somewhat standard power factor correcting controller (PFC) 100, shown schematically and in more detail in FIG. 4. Controller 100 includes a voltage wave shape input 102 detected at the positive output of full wave rectifier 22. The current magnitude is detected as a continuous, havorsine voltage in leads 110, 112 connected across shunt 80. Thus, the wave shape for the A.C. voltage and the wave shape of the actual current, together with the magnitude of the current, is directed to controller 100. The voltage to be regulated across capacitor 32 is sensed by leads 120, 122, which leads direct the output voltage of inverter A to controller 100 for comparison with a reference voltage $V_o$ at line 124. This reference voltage is set at a preselected level. Controller 100 utilizes the voltage wave shape on line 102, the current magnitude and wave shape across lines 110, 112, the actual output voltage across leads 120, 122 and the reference voltage, or set point, on line 124 to create trigger pulses or gating pulses in lines 130, 132, 134 and 136. The sequence and duration of the pulses in these lines control the voltage across capacitor 32 and attempt to provide a unity power factor at the input of the inverter. Such power factor correction, which is accomplished by controller 100, brings the current in inductor 30 into phase with the A.C. voltage at input source 20.

Inverter stage A is shown as a full bridge current source inverter. When the "first" switch, including switches 40, 42, and the "second" switch, including 50, 52, are both closed, the current is increasing through input inductor 30 and through all of the switches. During this time, no current is flowing through primary 60 or secondary windings 62, 64. When the "second" switch is opened and, thus, non-conductive, all current from inductor 30 is directed through the "first" switch and through primary 60 in a first direction. This produces a current pulse in one of the secondary windings. During this time, the current is decreasing through input inductor 30. The "second" switch is then returned to its conducting state so that both switches are conducting and current is again increasing through input inductor 30 and through all of the switches. Then the "first" switch is opened to become non-conductive, which causes the current from inductor 30 to be directed through the "second" switch and through primary 60 in a second direction. This produces an opposite polarity current pulse in the other secondary winding. Alternating these switch conditions directs current pulses through primary 60 in opposite directions which causes symmetric transformer flux operation. The alternating current pulses in the secondary windings create a D.C. voltage across capacitor 32. The use of input inductor 30 makes the input source of the inverter a current source which can be easily programmed. The input current is controlled by PFC controller 100, which accurately controls the periods when both switches are conducting in a manner which causes the input current to follow a sinusoidal waveform in phase with the input voltage.

A standard chopper B is the second stage of two stage, or dual stage, arc welding power supply PS. A "third" switch 200 directs current from capacitor 32 through output inductor 202 through welding station W, or gap g. The inductor maintains a D.C. current, as switch 200 is operated by a pulse width modulator at high frequency greater than about 20 kHz. When the "third" switch is not conductive, freewheel diode 204 bypasses current through inductor 202 in accordance with standard welding technology. Controller 210 includes a pulse width modulator 211 for controlling the gating pulses for switch 200, according to the logic on output line 213. In accordance with standard practice, a ramp generator, or other oscillator, 215 directs high frequency pulses to line 213 at a duty cycle determined by comparator 219, which compares the current through shunt 221, sensed as a voltage across lines 212, 214 to a reference current as a voltage on line 216. The reference voltage $V_r$ is adjustable by rheostat 218. The chopper functions in accordance with standard chopper technology, with the duty cycle of the pulses on line 213 controlling the current through gap g. In this manner, the chopper output stage of power supply PS is optimally operated, while inverter A is controlled to maintain the desired characteristics of input A.C. source 20. This two stage, or dual stage, power supply has advantages not obtainable by either an inverter or a chopper when these switching power supplies are used separately for arc welding. By reducing the inductance of inductor 202, the pulse width modulator can create complex wave shapes for the welding current through gap g.

Start-up and shut-down operation of power supply PS is achieved by an auxiliary winding 220 magnetically coupled by core 222 with input inductor 30. Winding 220 includes a grounded positive terminal 224 and a diode 226 connected to the positive terminal of output capacitor 32. During start-up the output voltage across the capacitor and its reflected primary voltage are both zero. Without any reflected voltage the input inductor 30 does not have the ability to magnetically reset. This could lead to the inductor saturating and the switches being over loaded. Auxiliary winding 220 provides the needed discharge path for inductor 30 during start-up. When output capacitor 32 is fully charged, the auxiliary winding 220 does not conduct current. At shut-down, all of the switches are turned off and the input inductor 30 requires a way to discharge. The auxiliary winding 220 provides this discharge path at shut-down.

Figure 3:
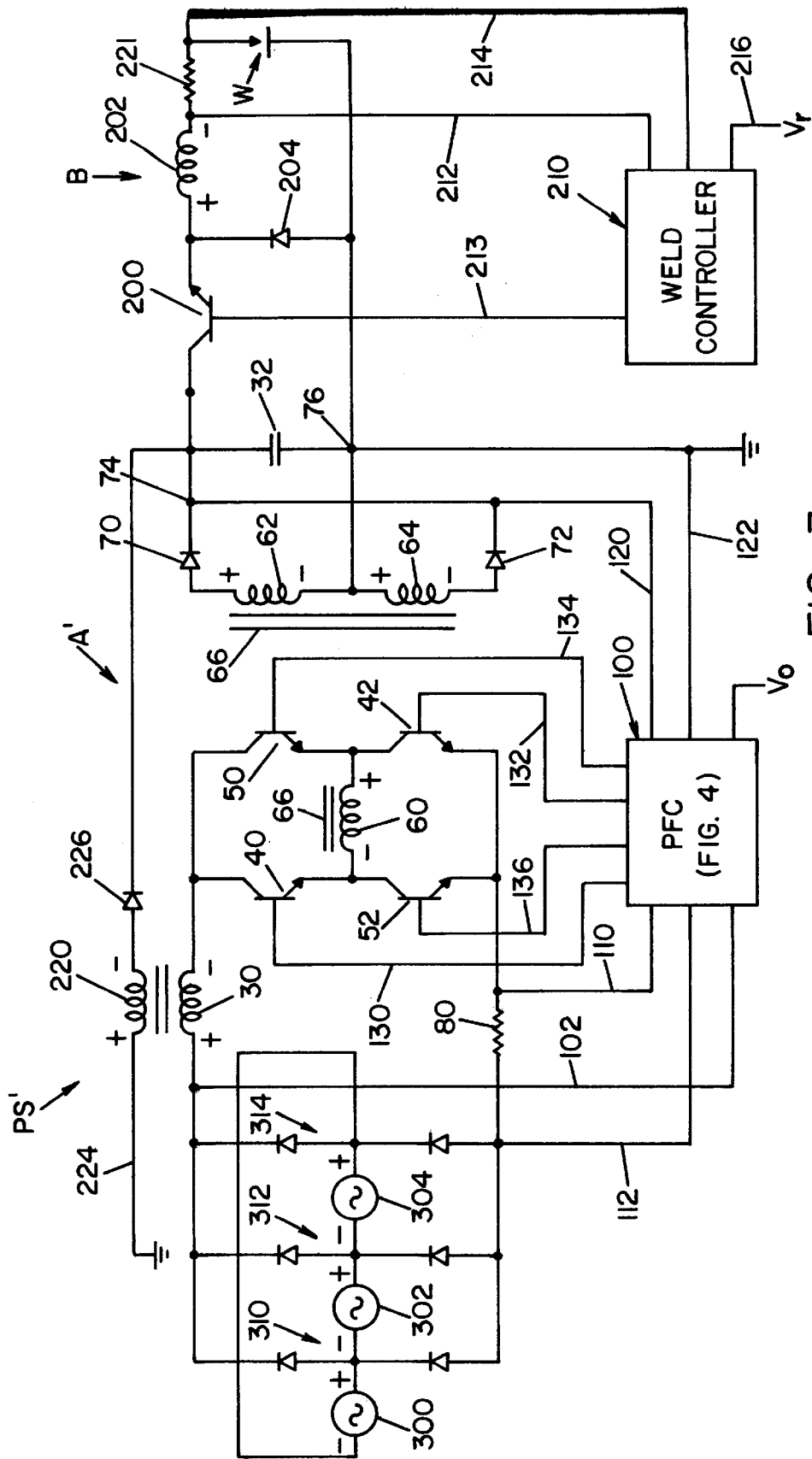
FIG. 3 is a wiring diagram illustrating a second preferred embodiment of the present invention using a full bridge inverter with a three phase input.
Figure 7A:
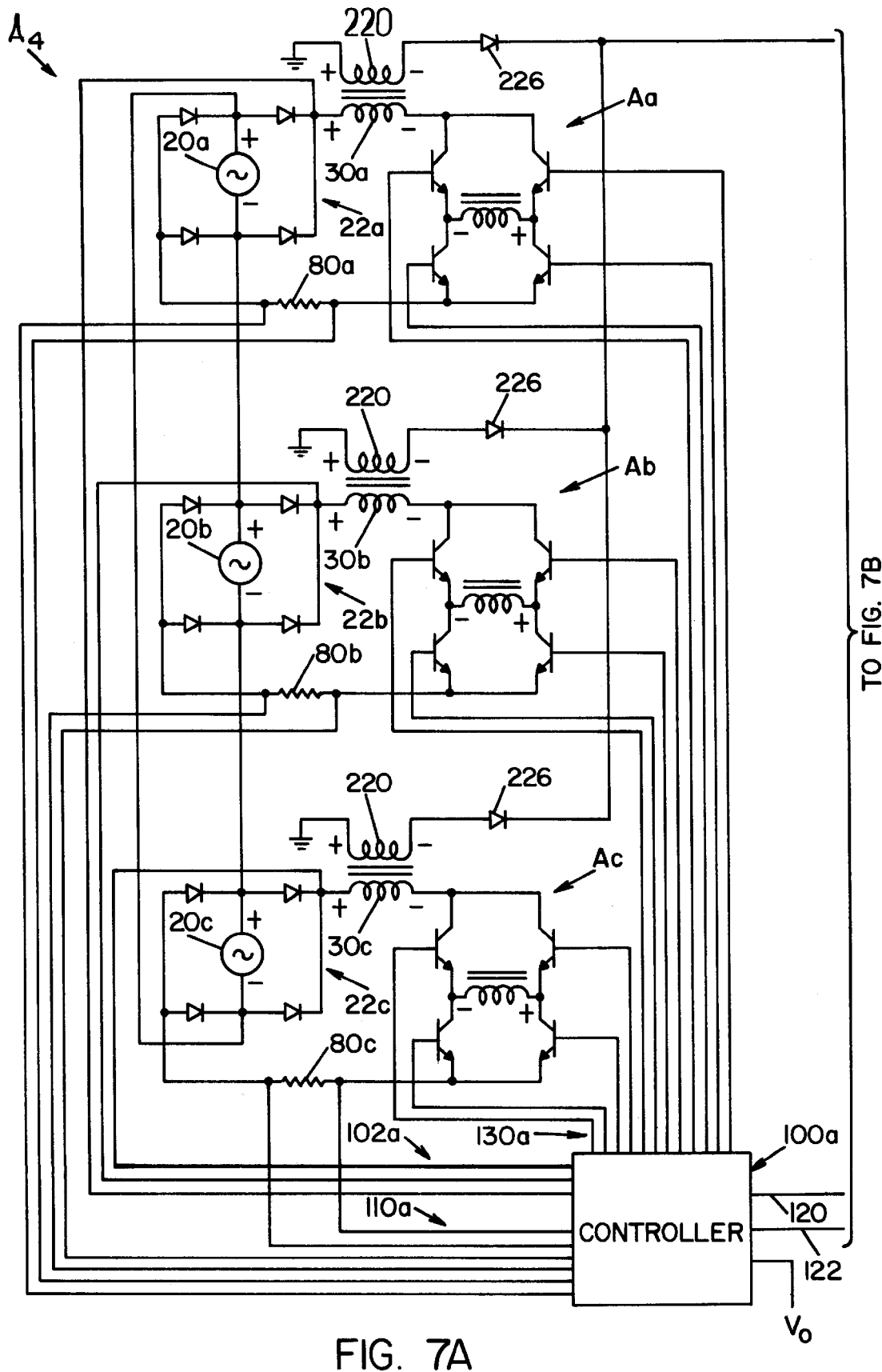
Figure 7B:
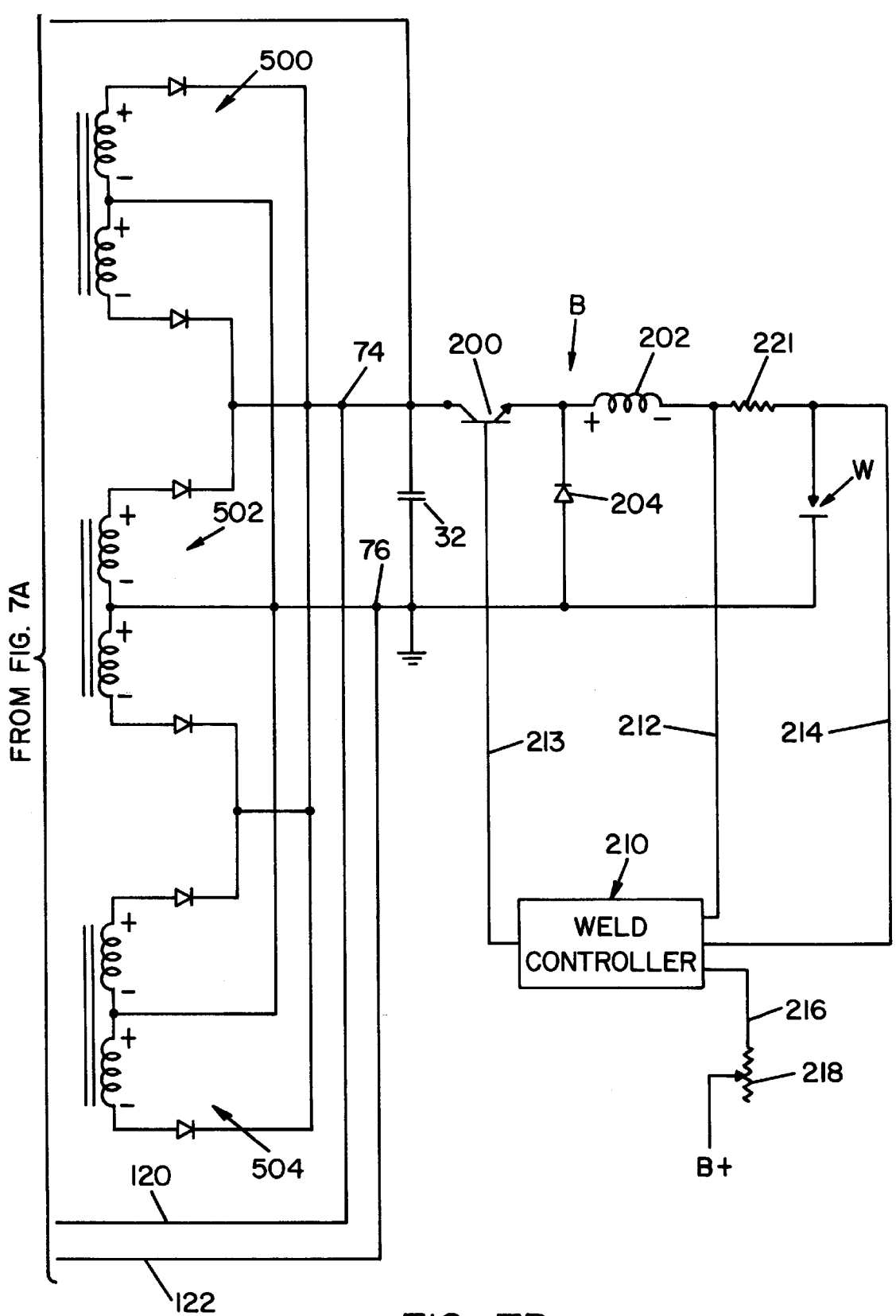

Referring now to FIG. 3, power supply PS' includes like numbered components as used in power supply PS; however, inverter A' includes a three phase input network 300, 302 and 304 so that the inverter is driven by a three phase A.C. voltage source. In accordance with this modification of the preferred embodiment, A.C. voltage sources 300, 302 and 304 are each provided with full wave rectifier networks 310, 312 and 314, respectively. Current flow through input inductor 30 is now a three phase full wave rectified current. A rectified three phase voltage wave shape is detected by line 102 and compared with the magnitude and wave shape of the inverter current sensed across shunt 80 by lines 110, 112. When using this simple three phase inverter, controller 100 is still capable of controlling the output voltage; however, it is not as successful in actually providing a unity power factor for the separate three phase input voltage source. To accomplish that objective, each of the phases has to have individual inverters and sensing arrangements, as in FIG. 1. Such a three phase system is schematically illustrated in FIGS. 7A and 7B and will be discussed with respect to that embodiment of the invention.

In practice, a Unitrode's PFC Controller No. UCC3857 is employed. This controller is somewhat standard and is schematically illustrated with respect to the inverter stage A of the present invention in FIG. 4. Pulse width modulator 350 has sawtooth input 352 controlling the frequency of the inverter switches in accordance with the voltage on line 354. The output signal of the pulse width modulator controls toggle network 360 which constitutes drivers for creating gating pulses, or trigger pulses, in lines 130, 132, 134 and 136. In this embodiment of the controller, the duty cycles of successive pulses control the power factor of the current in inverter A and also the bus voltage on output capacitor 32.

Isolation amplifier 370 detects the voltage on the output capacitor and directs voltage, as an analog signal, to the inverted input of error amplifier 372. The other input of amplifier 372 is the desired output voltage $V_o$ indicated as a voltage level on line 124. The output of error amplifier 372 is a voltage on line 372a, which voltage is combined with the voltage on output line 380a of root means square detector 380 and the wave shape of the input voltage appearing on line 102. This signal combination is accomplished by a multiplier 382 that multiplies signals on lines 102 and 372a. The product of voltages on lines 102 and 372a is reduced by the magnitude of the voltage on output line 380a, which is squared. The voltage on line 382a from multiplier 382 is directed to current amplifier 390 with the actual sensed current shape and magnitude on lines 110, 112. The output of the current amplifier is line 354, the voltage level of which controls the duty cycle of the "first" and "second" switches in inverter A to maintain the desired power factor of A.C. input source 20. Other control arrangements could be used for the inverter stage of the present invention and the description herein is representative in nature.

Figure 5:
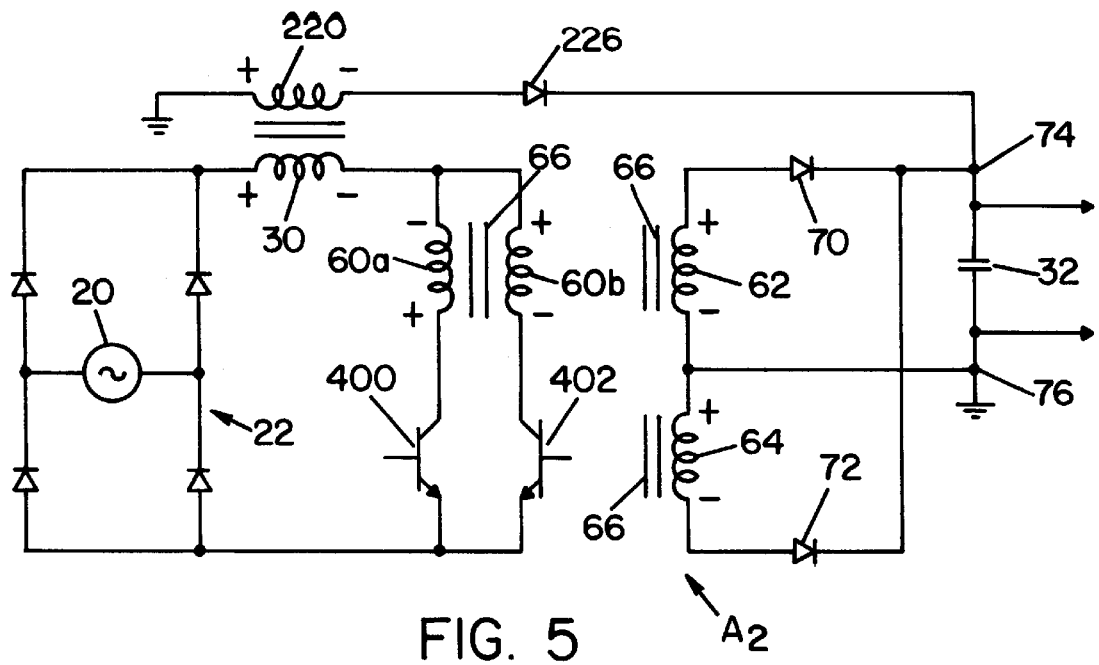
FIGS. 5 and 6 illustrate other current source inverters to be used as preferred embodiments of the present invention; and, FIGS. 7A and 7B show a wiring diagram of a three phase implementation of the present invention where the inverter is modified to control the power factor of each of the phases forming the A.C. input source of the inverter stage of the power supply.
Figure 6:
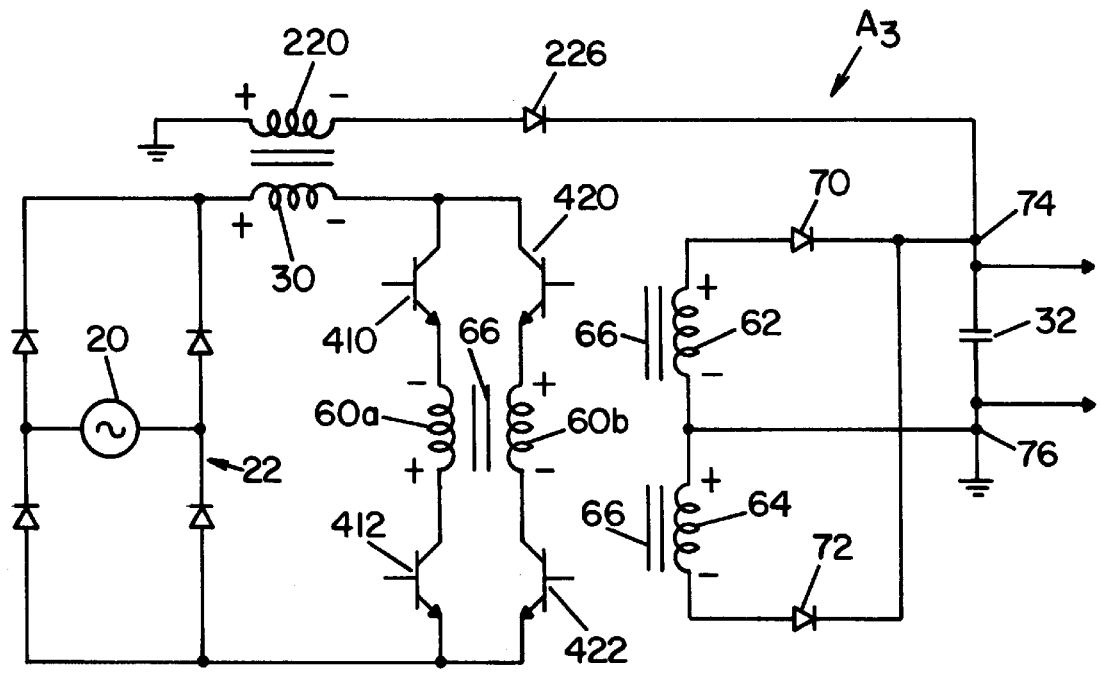

In FIG. 5 another current source inverter $A_2$ is illustrated wherein the inverter is a current source, push-pull inverter having the components as previously described. The primary winding means is in the form of two separate primary windings 60a, 60b, each associated with one of the secondary windings 62, 64. The "first" switch is a single switch 400 and the "second" switch is a single switch 402. As previously described, current pulses are directed from input inductor 30 through winding 60a or winding 60b according to the conductive state of switches 400, 402. In a like manner, a current source, double forward inverter $A_3$ can be employed as a current source inverter, as shown in FIG. 6. Current through input inductor 30 is passed through primary windings 60a, 60b by the "first" switch in the form of two switches 410, 412 and a "second" switch in the form of two separate switches 420, 422. Inverters $A_2$, $A_3$ are current source inverters which can be employed in the preferred embodiment as illustrated in FIGS. 1, 2 and 3.

FIG. 3 illustrates a topography for driving the inverter stage by three phases 300, 302 and 304. This topography incorporates a single switching network for all three phases. In practice, it may be desirable to have a separate switching network for each phase. A three phase inverter $A_4$ is illustrated in FIGS. 7A and 7B, which are to be taken together and show inverter $A_4$ wherein each phase 20a, 20b and 20c includes its own full wave rectifier 22a, 22b and 22c with a switching network for the primary winding illustrated as network Aa, Ab, and Ac. The switching sequence for each of the separate switching networks is controlled by controller 100a, which controller is basically tandem arranged components as used in controller 100. The voltage wave form of each phase is introduced to controller 100a separately for each switching network by use of three lines grouped together as harness 102a. The current of the three phases is sensed across shunts 80a, 80b and 80c and is directed to controller 100a through the six wires in harness 110a. Controller 100a also receives a signal indicative of the D.C. voltage across output capacitor 32. Secondary networks 500, 502 and 504 direct rectified current from the individual switching networks Aa, Ab, and Ac, to the positive and negative terminals 74, 76, as previously explained. By using this topography, the power factor of each of the three phases can be accurately controlled in a manner similar to inverter A, shown in FIG. 2. Except for the individual primary and secondary networks for each of the phases in the inverter $A_4$, the operation of the two stage, or dual stage, arc welding power supply is the same as the previous description of the invention. Controller 100a is the bus controller to control the D.C. voltage on the input bus for chopper B, which D.C. voltage appears across output capacitor 32.

Having thus described the invention, the following is claimed:

1. A dual stage power supply for creating a D.C. welding current through an arc welding gap, said power supply comprising an input inverter stage with a transformer having a first polarity secondary winding, a second opposite polarity secondary winding and a primary winding means for creating current pulses in said secondary windings, a full wave rectified A.C. voltage source, a first switch having a transfer state for passing current through said primary winding means to create a first polarity current pulse in said first secondary winding, a second switch having a transfer state for passing current through said primary winding means to create a second polarity current pulse in said second secondary winding, a rectifier means connected to said secondary windings to rectify said current pulses to produce a D.C. output voltage of said inverter stage across a capacitor; and, an output chopper stage connected across said capacitor and including output leads connected across said arc welding gap, a third switch for gating said output current of said inverter stage at a controlled rate through said leads and through said arc welding gap, an output inductor in one of said leads between said third switch and said arc welding gap and a free wheeling diode across said leads between said third switch and said output inductor.

2. A dual stage power supply as defined in claim 1 wherein said primary winding means is a single winding and said first switch passes a current pulse through said single winding in a first direction when it is in the transfer state and said second switch passes a current pulse through said single winding in a second direction opposite to said first direction when it is in the transfer state.

3. A dual stage power supply as defined in claim 2 wherein said first switch and said second switch include two switches.

4. A dual stage power supply as defined in claim 1 wherein said primary winding means is first and second oppositely poled input windings and said first switch passes a current pulse through said first input winding when it is in the transfer state and said second switch passes a current pulse through said second input winding when it is in the transfer state.

5. A dual stage power supply as defined in claim 4 wherein said first switch and said second switch include two switches.

6. A dual stage power supply as defined in claim 5 including an input inductor in said inverter stage between said A.C. voltage source and said transformer.

7. A dual stage power supply as defined in claim 6 including a current limiting inductor connected between said capacitor and ground and magnetically coupled to said input inductor with a rectifying diode means for allowing current flow from only said current limiting inductor to said capacitor.

8. A dual stage power supply as defined in claim 4 including an input inductor in said inverter stage between said A.C. voltage source and said transformer.

9. A dual stage power supply as defined in claim 6 including a current limiting inductor connected between said capacitor and ground and magnetically coupled to said input inductor with a rectifying diode means for allowing current flow from only said current limiting inductor to said capacitor.

10. A dual stage power supply as defined in claim 2 including an input inductor in said inverter stage between said A.C. voltage source and said transformer.

11. A dual stage power supply as defined in claim 10 including a current limiting inductor connected between said capacitor and ground and magnetically coupled to said input inductor with a rectifying diode means for allowing current flow from only said current limiting inductor to said capacitor.

12. A dual stage power supply as defined in claim 1 including an input inductor in said inverter stage between said A.C. voltage source and said transformer.

13. A dual stage power supply as defined in claim 12 including a current limiting inductor connected between said capacitor and ground and magnetically coupled to said input inductor with a rectifying diode means for allowing current flow from only said current limiting inductor to said capacitor.

14. A dual stage power supply as defined in claim 4 including a pulse width modulator for controlling the time of successive conductive states of said third switch.

15. A dual stage power supply as defined in claim 14 including means for sensing the current through said welding gap and means for adjusting said time of said conductive state of said third switch in accordance with said sensed current.

16. A dual stage power supply as defined in claim 14 including a pulse width modulator for controlling said first and second switch in unison.

17. A dual stage power supply as defined in claim 2 including a pulse width modulator for controlling the time of successive conductive states of said third switch.

18. A dual stage power supply as defined in claim 17 including means for sensing the current through said welding gap and means for adjusting said time of said conductive state of said third switch in accordance with said sensed current.

19. A dual stage power supply as defined in claim 18 including a pulse width modulator for controlling said first and second switch in unison.

20. A dual stage power supply as defined in claim 1 including a pulse width modulator for controlling the time of successive conductive states of said third switch.

21. A dual stage power supply as defined in claim 20 including means for sensing the current through said welding gap and means for adjusting said time of said conductive state of said third switch in accordance with said sensed current.

22. A dual stage power supply as defined in claim 21 including a pulse width modulator for controlling said first and second switch in unison.

23. A dual stage power supply as defined in claim 4 including a pulse width modulator for controlling said first and second switch in unison.

24. A dual stage power supply as defined in claim 2 including a pulse width modulator for controlling said first and second switch in unison.

25. A dual stage power supply as defined in claim 1 including a pulse width modulator for controlling said first and second switch in unison.

26. A dual stage power supply as defined in claim 20 including means for detecting the voltage phase of said full wave rectified A.C. voltage source, means for sensing the phase of the current flow through said input inductor and means for controlling the transfer state of said first and second switch to shift said current phase toward said voltage phase.

27. A dual stage power supply as defined in claim 12 including means for detecting the voltage phase of said full wave rectified A.C. voltage source, means for sensing the phase of the current flow through said input inductor and means for controlling the transfer state of said first and second switch to shift said current phase toward said voltage phase.

28. A dual stage power supply as defined in claim 10 including means for detecting the voltage phase of said full wave rectified A.C. voltage source, means for sensing the phase of the current flow through said input inductor and means for controlling the transfer state of said first and second switch to shift said current phase toward said voltage phase.

29. A dual stage power supply as defined in claim 8 including means for detecting the voltage phase of said full wave rectified A.C. voltage source, means for sensing the phase of the current flow through said input inductor and means for controlling the transfer state of said first and second switch to shift said current phase toward said voltage phase.

30. A dual stage power supply as defined in claim 6 including means for detecting the voltage phase of said full wave rectified A.C. voltage source, means for sensing the phase of the current flow through said input inductor and means for controlling the transfer state of said first and second switch to shift said current phase toward said voltage phase.

31. A dual stage power supply as defined in claim 4 including a pulse width modulator for controlling the conductive gating of said third switch.

32. A dual stage power supply as defined in claim 2 including a pulse width modulator for controlling the conductive gating of said third switch.

33. A dual stage power supply as defined in claim 1 including a pulse width modulator for controlling the conductive gating of said third switch.

34. A dual stage power supply for creating a D.C. welding current through an arc welding gap, said power supply including an A.C. voltage source, a rectifier means for converting said A.C. voltage to a first D.C. voltage at a rectifier output, an inverter stage connected to said rectifier output through an input inductor, said inverter stage having means for converting said D.C. voltage into a second D.C. voltage across a capacitor; and, a chopper stage for reducing said second D.C. voltage at said welding gap.

35. A dual stage power supply as defined in claim 34 including means for sensing the current through said welding gap and means for adjusting said third D.C. voltage in accordance with said sensed current.

36. A dual stage power supply as defined in claim 34 including means for sensing the phase of said A.C. voltage and means for adjusting the current through said inductor toward said sensed phase, said adjusting means including means for controlling said inverter stage.

37. A method of creating a D.C. welding current through an arc welding gap for an A.C. voltage source, said method comprising the steps of:

(a) rectifying said A.C. voltage into a first D.C. voltage;

(b) passing a current through an inductor as a continuous havorsine D.C. current by said first D.C. voltage;

(c) converting said continuous havorsine D.C. current, by an inverter, into a constant D.C. voltage across a capacitor; and, (d) chopping said second D.C. voltage as it is applied to said welding gap.

38. A method as defined in claim 37 including the step of:

(e) correcting the power factor between said A.C. voltage and said continuous havorsine D.C. current.

39. A dual stage power supply for creating a D.C. welding current through an arc welding gap, said power supply comprising an input inverter stage with a full wave rectified A.C. voltage source, and an output capacitor; and, an output chopper stage connected across said capacitor and including output leads connected across said arc welding gap, a switch for gating said output current of said inverter stage at a controlled rate through said leads and through said arc welding gap, an output inductor in one of said leads between said switch and said arc welding gap and a free wheeling diode across said leads between said switch and said output inductor.

* * * * *